(12) United States Patent
Mohan

(10) Patent No.: US 8,332,736 B2
(45) Date of Patent: Dec. 11, 2012

(54) DECODER WITH RESILIENCY TO HANDLE ERRORS IN A RECEIVED DATA STREAM

(75) Inventor: Manisha Agrawal Mohan, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1048 days.

(21) Appl. No.: 12/324,904

(22) Filed: Nov. 28, 2008

(65) Prior Publication Data
US 2009/0144596 A1  Jun. 4, 2009

(30) Foreign Application Priority Data
Nov. 29, 2007  (IN) .......................... 2794/CHE/2007

(51) Int. Cl.
*H04N 7/64* (2006.01)
(52) U.S. Cl. ...................................................... 714/811
(58) Field of Classification Search .................. 714/776, 714/811
See application file for complete search history.

(56) References Cited

U.S. PATENT DOCUMENTS

| | | | | |
|---|---|---|---|---|
| 6,650,624 B1 * | 11/2003 | Quigley et al. | ............... | 370/252 |
| 6,754,277 B1 * | 6/2004 | Heinzelman et al. | .... | 375/240.27 |
| 6,850,519 B1 * | 2/2005 | Saito et al. | .................... | 370/389 |
| 7,020,203 B1 * | 3/2006 | Horowitz et al. | ......... | 375/240.24 |
| 7,886,201 B2 * | 2/2011 | Shi et al. | .......................... | 714/52 |
| 8,037,397 B2 * | 10/2011 | Luo et al. | ...................... | 714/799 |
| 8,068,721 B2 * | 11/2011 | Nguyen | ......................... | 386/326 |
| 2005/0185719 A1 * | 8/2005 | Hannuksela | .............. | 375/240.27 |
| 2006/0013318 A1 | 1/2006 | Webb et al. | | |
| 2006/0045190 A1 * | 3/2006 | Sun et al. | ................. | 375/240.27 |
| 2008/0049844 A1 * | 2/2008 | Liu et al. | .................. | 375/240.27 |
| 2008/0232472 A1 * | 9/2008 | Kwon | ....................... | 375/240.13 |
| 2009/0177949 A1 * | 7/2009 | Lamy-Bergot et al. | ....... | 714/784 |

OTHER PUBLICATIONS

"Martin Fiedler", "Implementation of a Basic H.264/AVC Decoder","Chemnitz University of Technology", Dated: Jun. 1, 2004, pp. 01-28.

* cited by examiner

*Primary Examiner* — Stephen M Baker
(74) *Attorney, Agent, or Firm* — Mirna Abyad; W. James Brady.; Frederick J. Telecky, Jr.

(57) ABSTRACT

A decoder provided according to an aspect of the present invention determines a type of each network abstraction layer (NAL) unit, and discards a NAL unit when the size of the NAL unit is inconsistent with the size according to the determined type. According to another aspect, a decoder corrects for errors in the non-pay load portions and uses the corrected non-pay load portions to recover the original data contained in the payload portions of the data stream. In an embodiment, various global parameters (which are applicable to the data stream unless changed further in the data stream) and the values in the slice headers are examined to correct the parameters in the slice headers. According to one more aspect, an end of frame is reliably detected by using an expected number of macro-blocks in a frame and a set of logical conditions of slice header parameters.

8 Claims, 7 Drawing Sheets

DECODER WITH RESILIENCY TO HANDLE ERRORS IN A RECEIVED DATA STREAM

RELATED APPLICATION

The present application claims the benefit of co-pending India provisional application serial number: 2794/CHE/2007, entitled: "Error Recovery Techniques for H.264 BP Decoder", filed on Nov. 29, 2007, naming Texas Instruments Inc. (the intended assignee) as the Applicant, and naming the same inventor as in the present application as inventor, and is incorporated in its entirety herewith.

BACKGROUND OF THE INVENTION

1. Technical Field

The present disclosure relates to video decoders, and more specifically to a decoder with resiliency to handle errors in receive data stream.

2. Related Art

Image frames are often required to be reconstructed from corresponding encoded data. Reconstruction refers to forming (recovering) the data, which is as close as possible to the original data from which the compressed/encoded data is formed. For example, data representing a sequence of image frames generated from a video signal capturing a scene of interest is often provided in a compressed/encoded form, typically for reducing storage space or for reducing transmission bandwidth requirements. Such a technique may necessitate the reconstruction of the scene of interest (the sequence of image frames) by uncompressing/decoding the provided data.

H.264 is an example standard according to which image frames can be represented in compressed form (thereby necessitating reconstruction). H.264 is described in further detail in ITU-T Recommendation H.264—"SERIES H: AUDIOVISUAL AND MULTIMEDIA SYSTEMS, Infrastructure of audiovisual services—Coding of moving video, Advanced video coding for generic audiovisual services", available from TELECOMMUNICATION STANDARDIZATION SECTOR of ITU.

A decoder receives data streams encoded, formatted and transmitted according to the corresponding standard (e.g., H.264, noted above), and operates to recover (or reconstruct) the video information (e.g., video frames) contained in the received video streams. Alternatively, the data may be read by a device from a storage medium and provided to a decoder. The received data streams contain both information required to decode the stream (for example, in the form of headers or other synchronizing data patterns) as well as the actual encoded and compressed image information.

Data streams received by a decoder may contain errors due to one of several factors such as noise in transmission channels or receiver, packet loss in switching networks, storage device faults, etc. The errors may be random errors, burst errors or block loss (e.g., loss of a packet containing many bytes) depending on the specific error mechanisms. For example, if the transmission channel used to transmit a video stream is a switching network, packet loss may be the primary error type in the received (video) data stream.

Errors in a received data stream may cause one or more undesirable effects, such as loss of decoder's synchronization with the transmitter, faulty transition of the decoder to a different decoding state, etc., and generally results in incorrect decoding and faulty rendering of the transmitted images at the receiver. The extent to which the errors affect the decoder in reconstructing the transmitted data may depend on (among other factors) the specific position (whether in a data portion or a header portion, etc.) in the data stream of the corrupted bits. Errors in a header portion, for example, may cause a decoder to enter into a wrong decoding state, from which the decoder may not be able to recover.

Some prior H.264 decoders handle errors in received data streams by stopping the decode operations as soon as error is detected in the stream. Decoding may be resumed when a decoder 'reset' state is reached (for example, when an IDR type of frame is received next in H.264 standard). However, if errors are frequent, or a decoder reset command is not received by the decoder, the above approach may result in no decoding of valid data. An alternative approach may ignore such errors and continue decoding the data stream, in which case, the decoder may enter a wrong decoding state, and may not be able to recover from the errors.

Several aspects of the present invention enable error resiliency (tolerance to errors, for example, by recovering) in decoding such data streams.

SUMMARY

A decoder provided according to an aspect of the present invention determines a type of each network abstraction layer (NAL) unit, and discards a NAL unit when the size of the NAL unit is inconsistent with the size according to the determined type. The type of each NAL unit may be determined by examining/parsing/decoding the portion of a data stream representing the NAL unit.

In the context of H.264 protocol, such discarding may be performed for non-VCL (video coding layer) type of NALs. By avoiding processing of erroneous NAL units (as manifested by incorrect length), problems such as those noted in the background section may be avoided.

According to another aspect of the present invention, a decoder corrects for errors in the non-pay load portions and uses the corrected non-pay load portions to recover the original data contained in the payload portions of the data stream. Again, by correcting the non-payload portions, problems such as those noted in the background section may be avoided.

In an embodiment implemented in the context of H.264 standard, global parameters (which are applicable to the data stream unless changed further in the data stream) contained in PPS and SPS type of NAL units and the values in the slice headers are examined to correct the parameters in the slice headers.

According to yet another aspect of the present invention, an end of frame is detected reliably. In an embodiment, entire slice (including the non-payload and payload section) are examined to detect any errors. If no errors are detected, the end of frame is signaled based on an expected number of macro-blocks in the frame. If errors are detected in the slice, the end of frame is determined based on various parameter values present in the non-pay load portion of the slice. By using such different approaches to detecting the end of frame, the start of frames (reaching a known state) may be reliably detected, thereby avoiding some of the problems noted in the background section above.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

The features of the invention are described below with several examples for illustration.

1. Example Environment

Figure 1A:
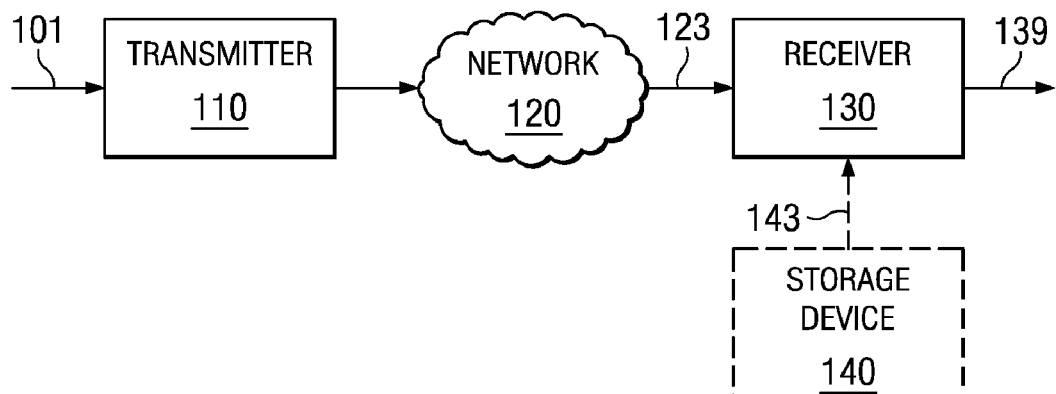
FIG. 1A is a block diagram illustrating an example environment in which several features of the present invention may be implemented.

FIG. 1A is a block diagram illustrating an example environment in which several features of the present invention may be implemented. The example environment is shown containing only representative systems for illustration. However, real-world environments may contain many more systems/components as will be apparent to one skilled in the relevant arts by reading the disclosure provided herein. Implementations in such environments are also contemplated to be within the scope and spirit of various aspects of the present invention. The diagram is shown containing transmitter 110, network 120, receiver 130 and storage device 140.

Transmitter 110 receives unprocessed (raw) video data from a corresponding source, for example, a video camera (not shown), in any of formats such as RGB, YUV, etc. Transmitter 110 processes (for example, compression, encoding, quantization, etc., according to H.264 standards), and transmits the processed video data in an encoded and/or compressed format to network 120. The video data transmitted may represent image frames, with each image frame containing a set of pixel values representing, for example, a captured image when viewed as a two-dimensional area.

Network 120 forwards, on path 123, the video data received from transmitter 110 to receiver 130. The operations in network 120 may be performed consistent with corresponding standards and protocols, such as internet protocol (IP), asynchronous transfer mode (ATM), or other proprietary techniques.

Storage device 140 stores video data in an encoded and/or compressed format (similar to the format transmitted by transmitter 110) on a storage medium (contained within or externally, not shown) such as compact disk, magnetic tape, etc., and on request, provides video data to receiver 130 via path 143.

Receiver 130 receives video data (e.g., in the form of binary streams) from either network 120 or storage device 140. A decoder contained in receiver 130 reconstructs the received video data to generate video frames, and may provide the frames to a display device (not shown) for display.

Several features of the present invention are described below in the context of an H.264 decoder. However, it should be appreciated that the features can be implemented according to other standards as well, as will be apparent to one skilled in the relevant arts by reading the disclosure provided herein.

2. Decoder

Figure 1B:
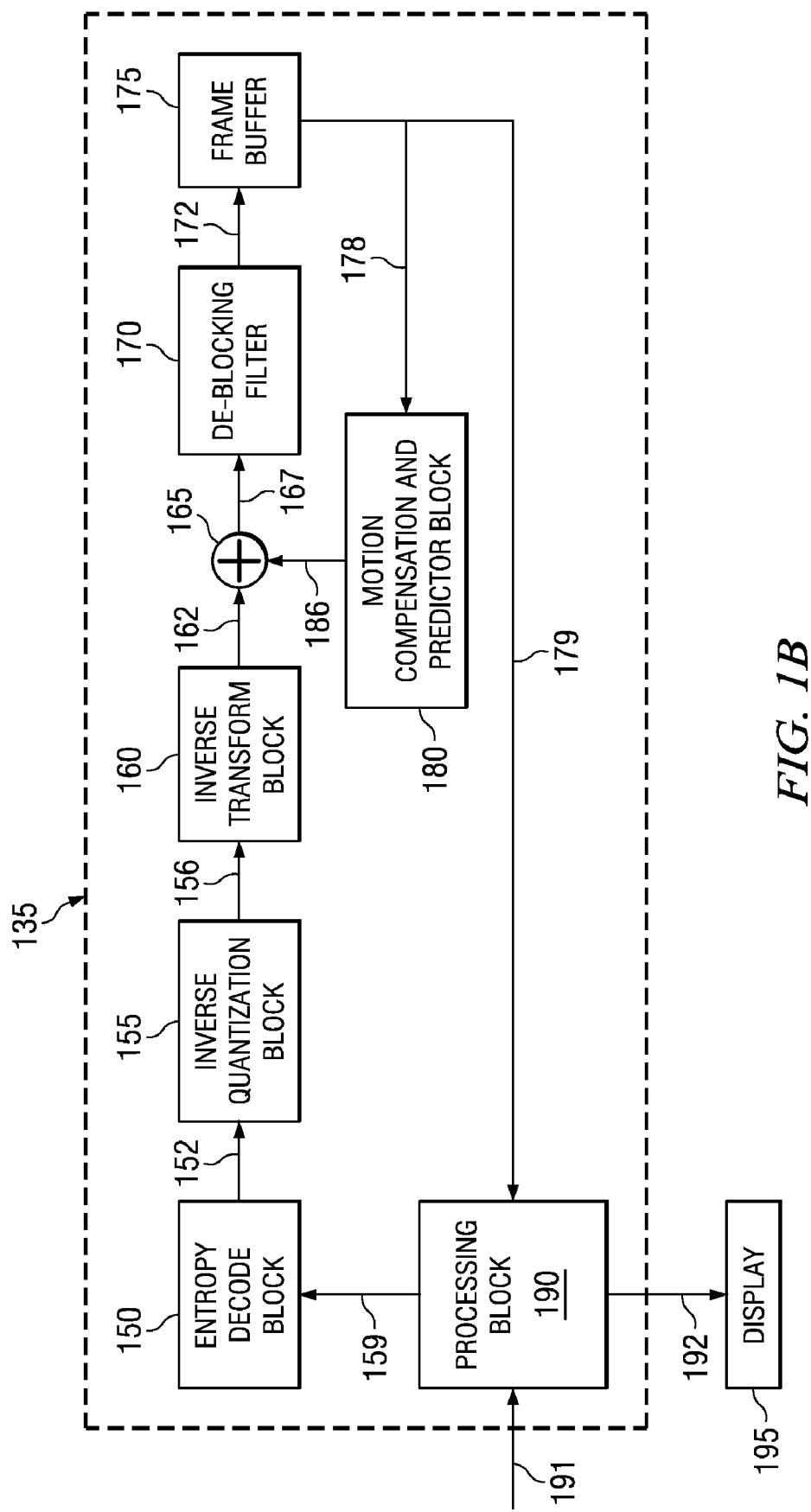
FIG. 1B is a block diagram of the internal block-level details of an H.264 decoder, illustrating an example embodiment in which several features of the present invention can be implemented.

FIG. 1B is a block diagram of the internal block-level details of an H.264 decoder, illustrating an example embodiment in which several features of the present invention can be implemented. Decoder 135 is shown containing entropy decode block 150, inverse quantization block 155, inverse transform block 160, summer block 165, de-blocking filter 170, frame buffer 175, motion compensation and predictor block 180, processing block 190. In addition, display 195 is also shown in FIG. 1B. Decoder 135 may be implemented within receiver 130 (FIG. 1A) or externally.

Only some of the details of decoder 135 as pertinent to the features described below are shown in FIG. 1B for conciseness. For further details of the H.264 standard, the reader is referred to the document noted in the background section. Further, though shown as separate blocks with distinct functionalities merely for illustration, the various blocks of FIG. 1B may be implemented using more or fewer blocks, possibly with some of the functionalities merged or split into one or multiple blocks (particularly when implemented as software modules).

Processing block 190 receives the compressed and encoded video stream on path 191 (which may correspond to paths 123 or 143 of FIG. 1A), and parses the received video data stream in accordance with the H.264 standard. Parsing may include identification of the start of each transmitted unit (termed a Network Abstract Layer unit or NAL unit in H.264) by locating the start code of each NAL unit.

Processing block 190 may determine the portions of the received bit stream which represent image data (typically in the form of encoded and compressed macro-blocks), as against various other parameters such as headers and NAL units not containing video data). Processing block 190 forwards portions containing the coded macro-blocks to entropy decode block 150 on path 159. Processing block 190 received reconstructed image frames from frame buffer 175 via path 179, and provides the image frames to display 195 for display.

Entropy decode block 150, inverse quantization block 155, inverse transform block 160 perform operations which are the inverse of coding, quantization and transform blocks in the corresponding transmitter (containing an H.264 encoder).

Entropy decode block 150 receives the coded macroblocks on path 159, and operates to perform entropy decoding on the entropy coded macro-blocks. Entropy decode block 150 forwards, on path 152, the entropy-decoded data stream to inverse quantization block 155.

Inverse quantization block 155 re-scales the quantized coefficients received on path 152, for example, by multiplying each of the coefficients by an integer value to restore each of the coefficients to the original scale level. Inverse quantization block 155 forwards the inverse-quantized coefficients to inverse transform block 160 on path 156.

Inverse transform block 160 performs an inverse transform (inverse discrete cosine transform—inverse DCT) of the re-scaled coefficients received on path 156, to re-create each block of residual data, which may be combined to form a macro-block (MB).

Corresponding to each macro-block, motion compensation and predictor block 180 forms at least substantially identical prediction to the one created by the encoder contained in transmitter 110. Summer block 165 adds the predictions received from motion compensation and predictor block 180 on path 186 to the corresponding decoded residuals received on path 162, to reconstruct a decoded macro-block. Summer block 165 forwards the decoded macro-blocks to de-blocking filter 170 on path 167.

De-blocking filter 170 may perform filtering operations on the received macro-blocks (decoded video) to improve visual quality which might have been impaired due to encoding process. In general, de-blocking filter 170 operates to improve the appearance of decoded pictures. De-blocking filter 170 forwards the filtered video on path 172 for storage in frame buffer 175. Frame buffer 175 may be implemented as a random access memory (RAM), flash memory, etc.

It may be appreciated that the raw video data (original data) would be recovered reasonably accurately when the entire encoded data is received error-free by processing block 190. However, as noted in the background section above, errors may be present in the data received on path 191. An aspect of the present invention provides for correction of the errors. The features can be appreciated by understanding the format in which H.264 data is encoded and transmitted. The details, as pertinent to at least some of the features, are described below in further detail.

3. H.264 Format

Figure 2A:
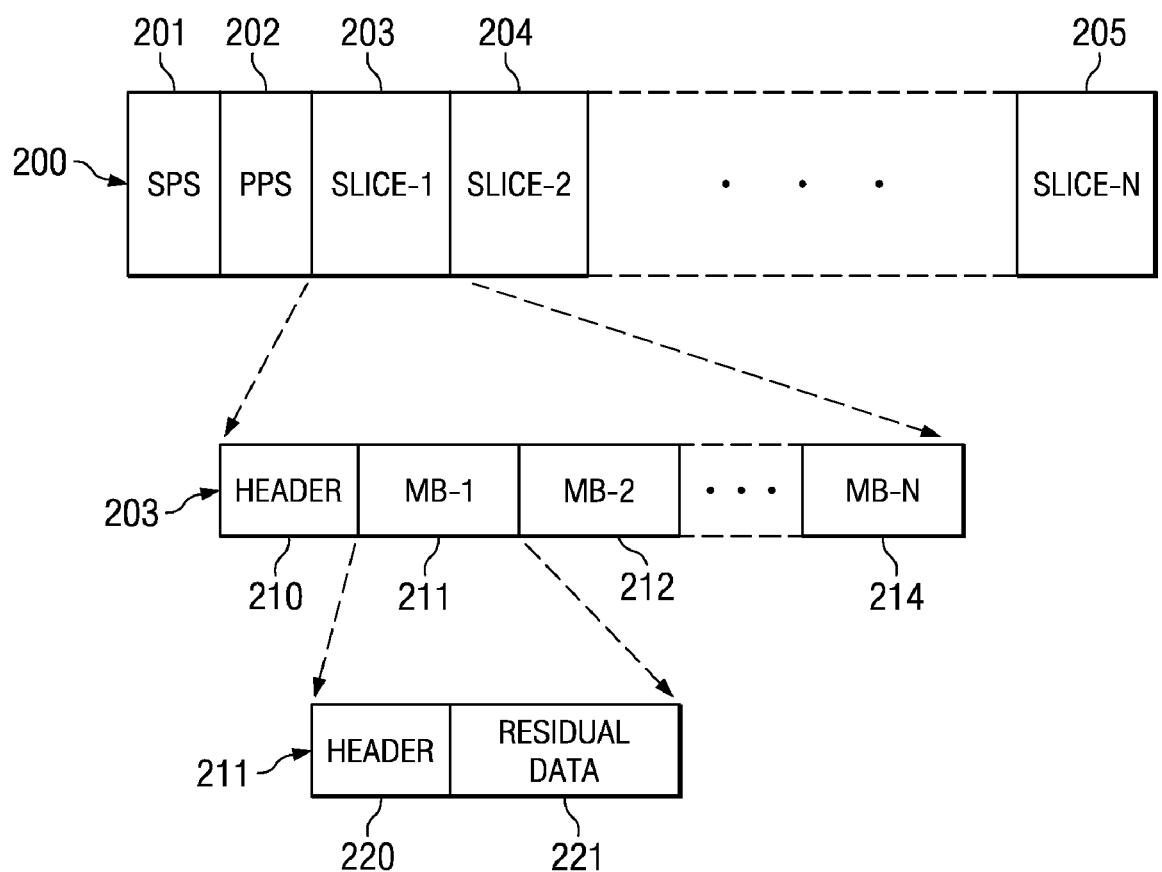
FIG. 2A is a diagram illustrating the format of a portion of an example H.264 data stream.

FIG. 2A is a diagram illustrating the format of a portion of an example H.264 data stream. The contents of FIG. 2A are shown merely by way of illustration, and H.264 data streams may contain various other types and sequences of units. A detailed description of the format and contents of H.264 data streams is provided in the ITU-T Recommendation H.264 noted above.

Broadly, a H.264 encoded stream contains of sequences of NAL units (which may be of different types), containing an indication of the type of data to follow and the bytes containing that data in the form of an RBSP (Raw bytes sequence payload) interspersed as necessary with emulation prevention bytes. Some example NAL unit types are Sequence Parameter set (SPS) type, Picture Parameter set (PPS) type, coded slice type, access unit delimiter type, etc.

Thus, bit-stream 200 is shown therein containing NAL units SPS (201), PPS (202), and coded slice units slice-1 through slice-N. The SPS/PPS type NALs which carry only non-payload header information are termed as header NALs, while the NALs containing the encoded image data (such as 203-205), are termed as data NALs. The data stream there can represent a fraction of a frame, a complete frame or multiple frames. As is well known, a slice refers to a set of macro-blocks (along with a header), which together can be entropy decoded independently without regard to the other slices. Slices 1, 2 and N are respectively shown numbered 203, 204 and 205.

Slice-1 (203) is in turn shown containing header 210, and macro-blocks MB-1 through MB-N, respectively numbered 211, 212 and 214. Macro-block 1 (211) is shown containing header 220 and residual data 221. Residual data 221 contains the coded pixel (image/video) data for that macro-block, consistent with the header 210/SPS/PPS according to the H.264 standard. The contents of SPS 201, PPS 202, and headers 210 and 220 are consistent with the H.264 standard, and not described in detail here.

It is however noted that SPS 201 may include information specifying the type of H.264 stream (Stream Type), image resolution, the H.264 profile being transmitted, etc. Similarly, PPS 202 may include information specifying the encoding mode, the specific slice group of an image frame, the number (identification tag) of the active (current) reference frame, etc.

Header 210 may include information specifying the type of slice (Slice Type, which determines the pattern of blocks selected for the slice), macro-block start address (identifying the first macro block in the frame), frame number, Picture_Order_Count, Ref_Pict_Marking, etc. Header 220 may include information specifying the type of macro-block, motion vectors, etc.

The data bits in residual data 221 constitute the payload being carried consistent with the other non-pay load information. The non-pay load information thus contains header 220, header 210, and NAL units SPS 201 and PPS 202. These NAL units are examples of global headers which impact the interpretation of all subsequent slices until changed by subsequent occurrence of the same information (with changed parameter values) in the NAL units.

With respect to FIG. 1B, processing block 190 parses data stream 200 to form identify specific portions of the stream as representing respective desired information and may thus be termed as decoding as well. The decoded information is provided to subsequent blocks for processing and thereby to recover the original data.

With combined reference to FIGS. 1B and 2A, processing block 190 provides macro blocks 1 through N to entropy decode block 150. As noted above, errors in one or more bits or portions of data stream 200 may cause corresponding undesirable effects in decoder 135. Such effects include, but may not be limited to, loss of synchronization between decoder 135 and the corresponding source of the encoded H.264 data (transmitter 110 or storage device 140), faulty transition of decoder 135 to a wrong decoding state, partial or no decoding of the stream etc., and generally results in incorrect decoding, incomplete reconstructed frames, faulty rendering of the transmitted images on display 195, and/or system instability.

It is noted that SPS, PPS and code slice type units are compulsory NAL units to be present in H.264 streams. Information contained in units transmitted preceding the first MB header in a slice (e.g., SPS 210 and PPS 202 type units) designed (per H.264 standards) to enable setting of a proper state of decoder 135, to enable decoding all the MBs in a received slice. Hence, SPS type units generally contain information common for (and necessary for enabling proper decoding of) an entire sequence of frames. Similarly, PPS type units may contain information common for groups of frames, and slice headers (such as 210) may contain information common for all MBs (macro-blocks) in the slice.

To briefly summarize, a H.264 bit-stream is composed of individually decodable NAL (network abstraction layer) units with a different RBSP (raw byte sequence payload) associated with different NAL unit types. NAL unit types include coded slices of pictures (e.g., slices 203), with header information contained in separate NAL units, called a Sequence Parameter Set (SPS) and a Picture Parameter Set (PPS). An optional NAL unit type is the Supplemental Enhancement Information (SEI) type unit.

Each bit-stream must contain one or more SPS and one or more PPS. Coded slice data include a slice header, which contains a PPS ID, used to associate the slice with a particular PPS, and fields used to group slices into pictures. The SPS and PPS type units may be repeated at intervals to allow random access, such as for mobile TV. Each NAL unit contains a "nal_unit_type" field in the first byte, and is preceded by a start code of three bytes: 0x000001, or four bytes: 0x00000001.

It may be appreciated that corruption of data other than in a MB header and residual data field (e.g., 221), and in particular error(s) the "nal_unit_type" field, can cause decoder 135 to enter a (wrong) state from which transition to the correct decoding state may not be possible or may be delayed in time. Errors in the "nal_unit_type" field may result in the field specifying a different, but valid, NAL unit type than intended, or a NAL unit type that is not specified by the H.264 standard. Errors causing a "nal_unit_type" field to indicate a different (valid) NAL unit type than intended may be particularly undesirable.

Similarly, errors in slice headers (such as header 210) may also cause decoder 135 to enter wrong decoding states. It is noted that, slices are generally independent entropy decodable units. Proper decoding of a current slice still requires much information from previous slices of current and/or previous frames. Therefore, error(s) in current slice may result in improper decoding of later MBs of slices in current as well future frames, thereby at least degrading visual quality of the displayed image frames (in display 195).

Figure 2B:
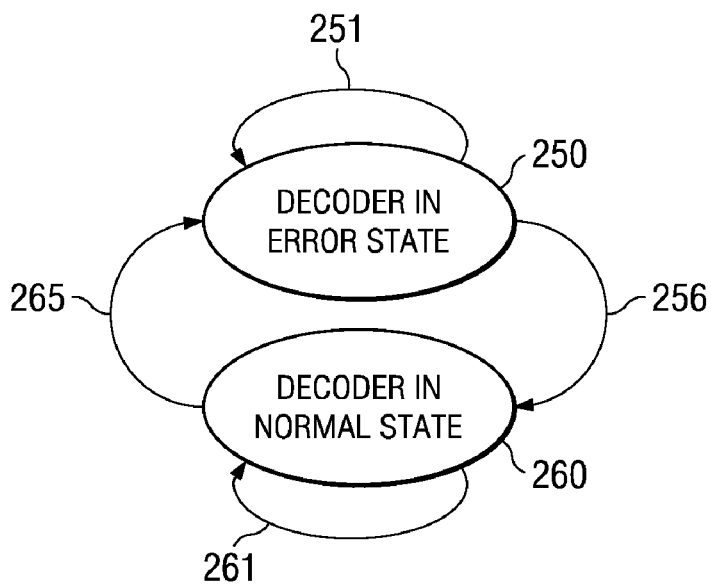
FIG. 2B is an example state transition diagram of decoder in an embodiment.

FIG. 2B is an example state transition diagram of decoder 135. State 260 represents a normal/correct state of operation of decoder 135, and state 250 represents an error state of operation of decoder 135. The state transitions occur while an input data stream is parsed/decoded by the decoder. When there are no errors, each NAL unit is accurately identified and processed, thereby having transition 261.

An error in the bit-stream, as indicated in FIG. 2B by arrow 265, may cause a transition from normal state 260 to an error state 250. Assuming further errors occur in payload type, sequence, frame or slice-level parameters (as indicated by arrow 251) contained either in PPS, SPS type units or slice headers, decoder 135 may not be able to recover from the error state and transition to normal decoding state 260.

Assuming the entry into error state 250 was caused by errors in an MB header, decoder 135 may still be able to recover from the error state once it latches (receives and properly decodes) a subsequent NAL unit, as indicated by arrow 256.

Several features of the present invention enable an H.264 decoder to detect errors in NAL units such as SPS, PPS, SEI etc., which are above (at a higher level of importance in terms of enabling proper decoding than) a MB level. Several other features of the present invention detect and correct errors occurring in slice headers. The features are described next.

4. Error Detection for NAL Unit-Type Errors

Figure 3A:
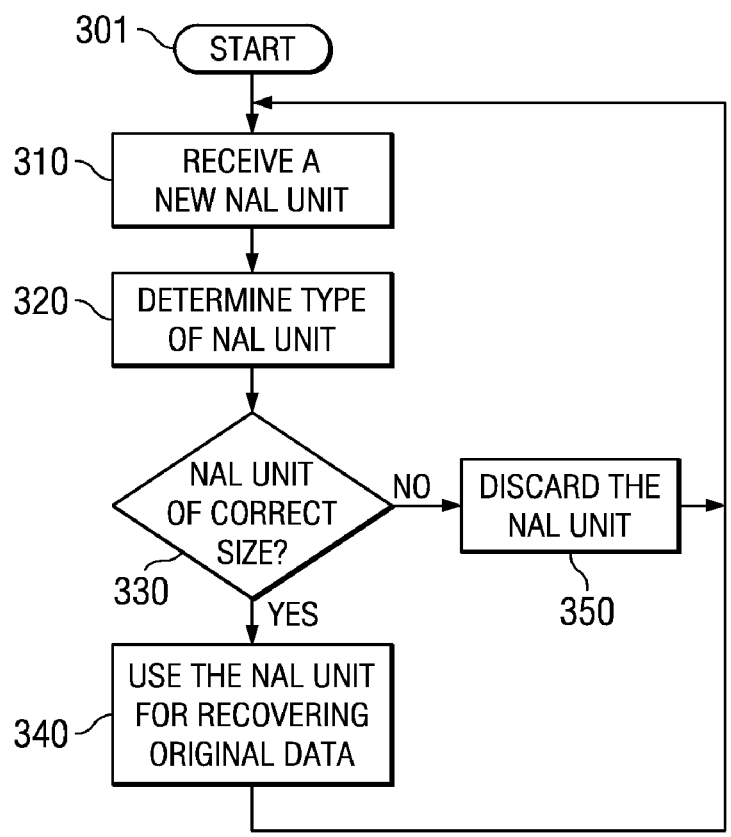
FIG. 3A is a flowchart illustrating the manner in which some of the errors are handled according to an aspect of the present invention.

FIG. 3 is a flowchart illustrating the manner in which some of the errors are handled according to an aspect of the present invention. The flowchart is described with respect to FIGS. 1A, 1B and 2A, and in relation to processing block 190, merely for illustration. However, various features can be implemented in other environments and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 301, in which control passes immediately to step 310.

In step 310, processing block 190 receives a new NAL Unit. Given that the NAL units are of multiple types intended for different purposes, the sizes of different NAL units can be different. As a result, each NAL unit may span multiple transport packets (e.g., IP packets) or multiple NAL units can be contained in the same transport packet.

In H.264 standard, the data forming each NAL unit may be determined as the data between two consecutive NAL unit header portions (identified by start code of three bytes: 0x000001, or four bytes: 0x00000001). However, alternative techniques, consistent with the applicable standard, can be employed to determine the boundaries of each NAL unit. The NAL unit may be any one of the various NAL unit types noted above. Control then passes to step 320.

In step 320, processing block 190 parses the received NAL unit (or the data stream portion deemed to represent the NAL unit) and determines the type of the NAL unit. The type of the NAL unit specifies the actual/correct size of the corresponding NAL unit. When in error, the bits in the "nal_unit_type" field may indicate a different NAL unit type than intended/encoded. The different/erroneous type value may still be a valid value permitted by the standard. Control then passes to step 330.

In step 330, processing block 190 checks whether the NAL unit is of correct size based on (consistent with) the type of the NAL determined above. If the size of the NAL unit as obtained by parsing by the decoder equals (in general, is consistent with) the actual size, control passes to step 340, and to step 350 otherwise.

In step 340, processing block 190 uses the NAL unit to recover the original data encoded in the data stream being decoded. It should be appreciated that the recovered data may be contained in other NAL units. As an example, processing block 190 may forward bytes in the decoded NAL unit corresponding to coded macro blocks to entropy decode block 150. Control then passes back to step 310, and the operations of the flowchart may be repeated.

In step 350, processing block 190 discards the data obtained by decoding the NAL unit. In an embodiment, implemented in the context of H.264 protocol, only non-VCL (video coding layer) type NAL units are discarded. As is well known, VCL NAL units carry the macro-blocks containing the encoded image data. Thus, non-VCL NAL units would contain header information (e.g., SPS and PPS noted above).

Discarding implies information parsed in those erroneous non-VCL NAL units is not used while parsing the future VCL type NAL units. On the other hand, the term using implies that the information is processed for recovering the original data present in the same or other (later received) NAL units. Control then passes back to step 310, and the operations of the flowchart may be repeated for the next NAL unit.

Figure 3B:
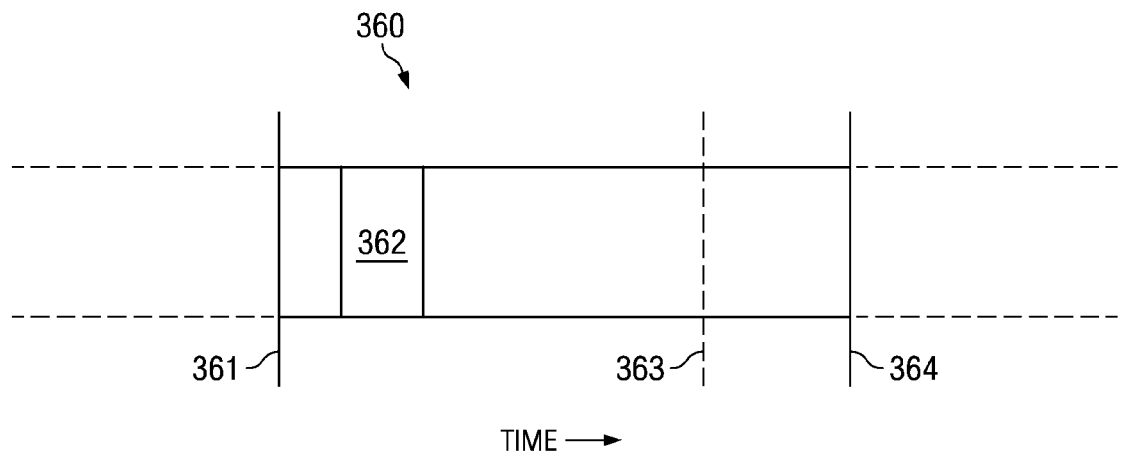
FIG. 3B is a diagram illustrating the discarding of received NAL units with incorrect size.

FIG. 3B is a diagram illustrating the discarding of a received NAL unit with incorrect size, and shows a data stream 360 being received by a decoder. Size of a received and parsed NAL unit is indicated in the Figure as the size (for e.g., in terms of number of bytes) as represented by the time interval between time instances 361 and 364. However, if 'type' field 362 determined by the decoder specifies that the actual size of the NAL unit is the number of bytes in the interval between time instances 361 and 363, the decoder discards the entire received number of bytes contained in the interval 361 to 364.

Thus, according to an aspect of the present invention, decoded syntax (for example NAL unit type) of a given NAL unit is processed further (to reconstruct image frames) only if the entire NAL size is consumed in decoding the NAL. The parsed information is discarded otherwise. As a result, unrecoverable errors and entry to wrong decoding states may be prevented.

Another aspect of the present invention detects and corrects errors in slice headers. In general, the standard needs to be studied to identify the relationship between various non-payload portions to determine the presence of errors and correct the errors if possible. The manner in which such an approach is used to correct errors in slice headers in H.264 standard, is described below with examples.

5. Error Correction for Errors in Slice Headers

Many parameters/information present in slice headers (such as header 210 of FIG. 2A) follow some relationship with header parameters in earlier decoded slices belonging to a same or previously decoded frame. According to an aspect of the present invention, such relationship is checked to detect and correct errors in slice headers. In an embodiment of the present invention, End of Frame (EOF) is detected reliably, and several slice header parameters are corrected. The detection and correction of errors depends on the specific protocol specification, and the pertinent details of H.264 are described below first.

It is noted that the H.264 standard does not expressly specify markers (e.g., specific bit value sequence) to indicate frame boundaries. Each slice header contains a set of information, based on which a H.264 decoder has to detect the end of a previously decoded frame. H.264 standard specifies seven syntax checks (based on parameters or fields provided in the slice headers) for H.264 BP (basic profile) data streams, to detect whether a decoded frame has ended (EOF) or not. The syntax checks (based on parameter values and other logical attributes of fields in slice headers), as specified by the standard, are briefly noted below:

frame_num differs in value (for current and previous slices).

pic_parameter_set_id differs in value.

nal_ref_idc differs in value with one of the nal_ref_idc values being equal to 0.

pic_order_cnt_type is equal to 0 for both and either pic_order_cnt_1sb differs in value, or delta_pic_order_cnt_bottom differs in value.

pic_order_cnt_type is equal to 1 for both and either delta_pic_order_cnt[0] differs in value, or delta_pic_order_cnt[1] differs in value.

nal_unit_type differs in value with one of the nal_unit_type values being equal to 5.

nal_unit_type is equal to 5 for both and idr_pic_id differs in value.

However, when one or more bits in the slice header(s) corresponding to the parameters noted above is/are corrupted, a decoder may falsely flag the corresponding slice as belonging to a new frame, which may result in the decoder producing (erroneously) extra frames. Alternatively, errors may also cause the decoder to interpret a slice belonging to a new frame as a part of current frame, thereby causing frame wraps.

In an embodiment of the present invention, assuming no errors in the bit-stream are detected, end of frame (EOF) is determined by a decoder based on a count of the total number of macro-blocks that are received. A macro-block counter is used to maintain a count of macro-blocks as they are received and decoded. In addition, the expected numbers of MBs per frame are determined, for example, based on the resolution of the frames. If the number of MBs decoded is equal to the total number of MBs per frame (and no error is detected while decoding the frame), then end of frame (EOF) is flagged. In H.264 standard, the resolution information is sent in a corresponding SPS type unit.

However, when error(s) is/are detected while decoding a frame, the number of MBs decoded may not be reliable, and additional checks for EOF is performed based on condition checks described below. Such errors may be due to errors in bits, or block loss (when entire slice/packet is lost, for example, when transmitted through in packet switching networks).

To handle such error cases, condition checks noted below are performed in the decoder. The parameters noted in the condition checks below are as defined by H.264 standard.

Condition 1: frame_num is a function of nal_ref_idc:

The value of frame_num is constrained as noted below:

If the current frame (picture) is an IDR (instantaneous decoding refresh) picture, frame_num shall be equal to 0.

If gaps_in_frame_num_value_allowed_flag is equal to 0, and previous picture frame_num value is prev_frame_num, then value of frame_num for the current picture shall be:

equal to (prev_frame_num+1) % MaxFrameNum if previous frame is a reference frame (i.e., parameter nal_ref_idc != 0), and equal to prev_frame_num, if previous frame is not a reference frame (i.e., nal_ref_idc == 0), wherein, frame_num is the value (number) of the current frame, prev_frame_num is the value of the previous frame, nal_ref_idc is a parameter specifying whether a corresponding field, frame or picture is respectively a non-reference field, non-reference frame or non-reference picture respectively or not, MaxFrameNum is the maximum frame number possible, and gaps_in_frame_num_value_allowed_flag specifies if gaps between values of frame_num of consecutive frames is permissible or not, != is a 'not equal to' condition check, and % is the 'modulus' operator, Condition 2: Picture order count is unique for each frame between two IDRs.

Condition 3: IDR picture (parameter 'nal_unit_type' equals 5) should always be a reference picture (i.e., parameter 'nal_ref_idc should be non-zero).

Condition 4: Picture order count of consecutive non reference frames should always be in increasing order.

Condition 5: frame_num value of IDR frame (nal_unit_type == 5) is always zero.

In an embodiment of the present invention, when the data stream is erroneous (bit-corrupt/block loss/burst error), frame boundary between frames is detected based on one or more of the condition checks (conditions 1 through 5 noted above), and one or more of the H.264 specified syntax checks noted above. Different condition checks are used to detect frame boundary between two consecutive non-IDR frames, and between a non-IDR frame followed by an IDR frame.

The consolidated set of logical condition checks used to determine whether EOF has occurred or not is listed below (equations 1 through 7). The consolidated set is based on parameter values corresponding to a pair of consecutive slices (a 'currently processed' slice, and an 'immediately previous' slice (e.g., slice 4 and slice 3 respectively of FIG. 4, described below).

For a frame boundary between an IDR and a non-IDR frame, an EOF is detected if the following logical condition is satisfied:

((prev_nal_unit_type != 5) & (cur_nal_unit_type == 5) & (cur_frame_num == 0))    Equation 1 wherein,

'==' represents an 'equal to' comparison operation,

'&' represents a logical AND operation,

'!=' represents a 'not equal to' comparison operator, cur_nal_unit_type is a parameter specifying the type of a currently processed slice, prev_nal_unit_type is a parameter specifying the type of a slice immediately preceding the currently processed slice, cur_frame_num is a parameter specifying the frame number to which a currently processed slice belongs.

For a frame boundary between two consecutive non-IDRs frames, an EOF is detected if one or more of the following logical condition is satisfied:

When gaps_in_frame_num_allowed_flag is 0, and if:

(prev_nal_ref_idc != 0) & (frame_num == prev_frame_num+1% maxFrameNum) & (picture_order_count != prev_picture_order_cnt)    Equation 2

(prev_nal_ref_idc == 0) & (cur_nal_ref_idc == 0) & (frame_num == prev_frame_num) & (picture_order_count>prev_picture_order_cnt)    Equation 3

(prev_nal_ref_idc == 0) & (cur_nal_ref_idc != 0) & (frame_num == prev_frame_num)    Equation 4 b) If gaps_in_frame_num_allowed_flag is 1, and if (prev_nal_ref_idc != 0) & (frame_num != prev_frame_num) & (picture_order_count != prev_picture_order_cnt)    Equation 5

(prev_nal_ref_idc == 0) & (cur_nal_ref_idc == 0) & (frame_num == prev_frame_num) & (picture_order_count>prev_picture_order_cnt)    Equation 6

(prev_nal_ref_idc == 0) & (cur_nal_ref_idc != 0) & (frame_num == prev_frame_num)    Equation 7

With respect to equations 2-7 above, prev_nal_ref_idc is the value of nal_ref_idc (specifying whether a corresponding slice belongs to a reference frame or not) corresponding to an immediately previous slice, frame_num is the value of the frame number corresponding to the currently processed slice, prev_frame_num is the value of the frame number (frame_num) corresponding to the immediately previous slice, MaxFrameNum is the maximum value for frame_num, after that frame_num wraps to 0, and serves as a divisor for incrementing the frame_num value in the expression (frame_num % MaxFrameNum), picture_order_cnt is a variable corresponding to the currently processed slice, and having a value that is non-decreasing with increasing picture position in output order relative to the previous IDR picture in decoding order or relative to the previous picture containing the memory management control operation that marks all reference pictures as "unused for reference", prev_picture_order_cnt is the value of picture_order_cnt corresponding to an immediately previous slice, cur_nal_ref_idc is the value of nal_ref_idc corresponding to a currently processed slice, and specifies whether the slice belongs to a reference frame or not, prev_nal_ref_idc is the value of nal_ref_idc corresponding to an immediately previous slice, and specifies whether the slice belongs to a reference frame or not.

Figure 4:
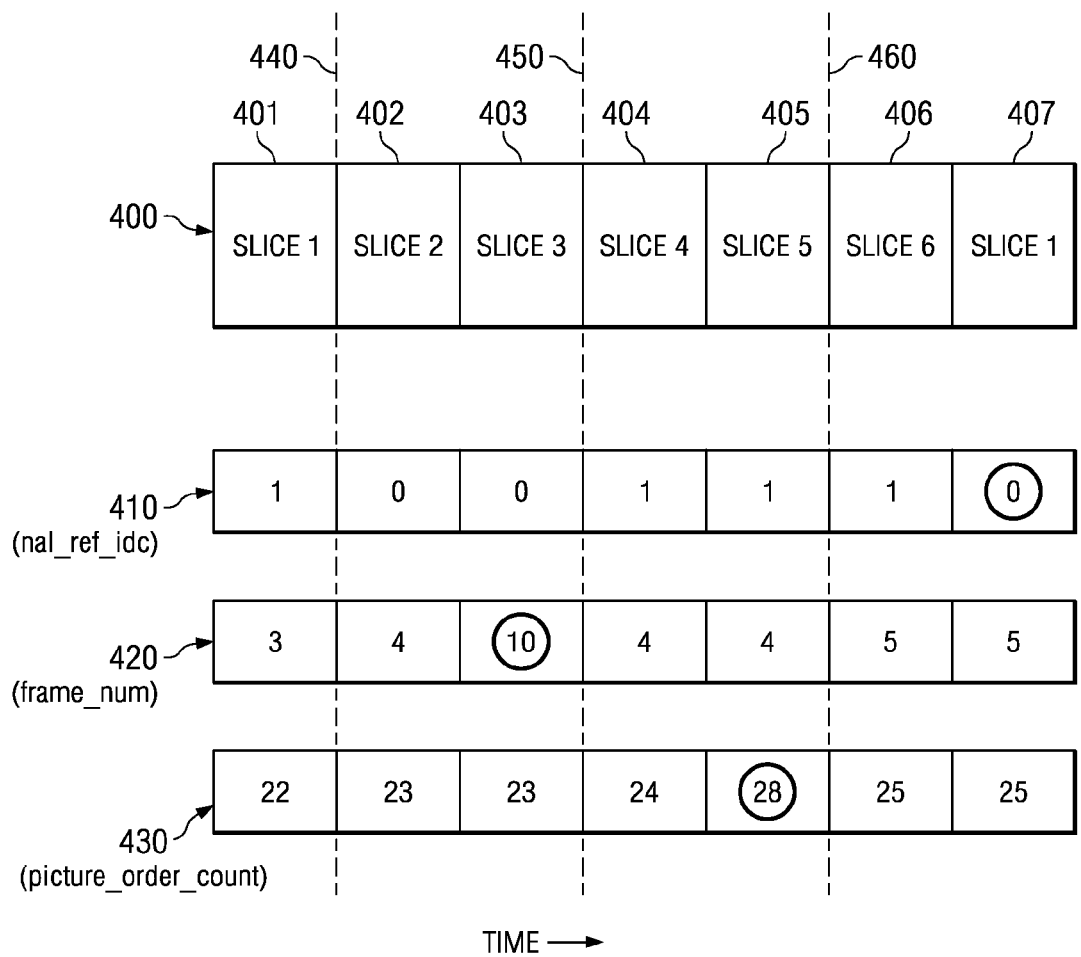
FIG. 4 is a diagram illustrating an example of determination of whether 'End of Frame' has occurred or not, in an embodiment of the present invention.

The condition checks described above to determine whether EOF has occurred or not are illustrated with respect to an example scenario shown in FIG. 4. The example described below assumes that the parameter gaps_in_frame_num_allowed_flag (noted above) is equal to zero. FIG. 4 shows a portion (400) of an example H.264 bit-stream, containing slices 1 through 7 (numbered 401 through 407). Entries in row 410 contain the values of nal_ref_idc parameter corresponding to each of the slices. Entries in row 420 contain the values of frame_num parameter corresponding to each of the slices. Entries in row 430 contain the values of 'picture order count' parameter corresponding to each of the slices. Markers 440, 450 and 460 denote actual frame boundaries (specifying EOF) when there is no corruption (errors).

However, if errors occur in the bit-stream, if the normal 7 syntax checks are performed as per H.264 standard, decoder may miss detecting the EOF correctly. In an embodiment of the present invention, despite the corruption in the bit-stream, based on the (5) condition checks noted above, errors in slice headers are corrected, thereby enabling correct EOF detection.

With respect to slice 3 (403), the previous value of nal_ref_idc (i.e., of slice 2 (402) is equal to 0. Hence, frame_num of current slice 403 is expected to be the same as for the previous slice, which is correctly received in the bit-stream. Further, the value of picture order count of current slice 403 has the same value (of 23) as picture order count of previous slice 402 (and conforms to condition 2 noted above). Hence, slice 3 (403) is not a new frame (EOF has not occurred at end of slice 2 (402)). Therefore, decoder 135 implemented according to aspects of the present invention, concludes that slices 2 and 3 belong to a same frame, and that the value (10) of frame_num received is incorrect.

With respect to slice number 5 (405), the previous value of nal_ref_idc is equal to 1 (of slice 404). Hence, the previous frame is a reference frame. If the current slice (slice 5) belongs to a new frame, then the corresponding frame_num value would be expected to increase by 1. However, the frame_num value is the same as the previous frame_num value of 4. Hence, decoder 135 concludes that picture order count received is in error and no EOF is signaled.

With respect to slice 7, the value of the previous nal_ref_idc is equal to 1. Hence, the previous frame is a reference frame. If the current slice (slice 7) belongs to a new frame, then its frame_num would be expected to increase by 1. However, the frame_num value is the same as the previous frame_num value of 5. Further, the value (25) of picture order count is the same as for the previous slice. Therefore value of nal_ref_idc received as 0 (non reference frame) is due to error in stream, and decoder 135 does not flag an EOF.

6. Reliable Detection of End of Frame

Figure 5:
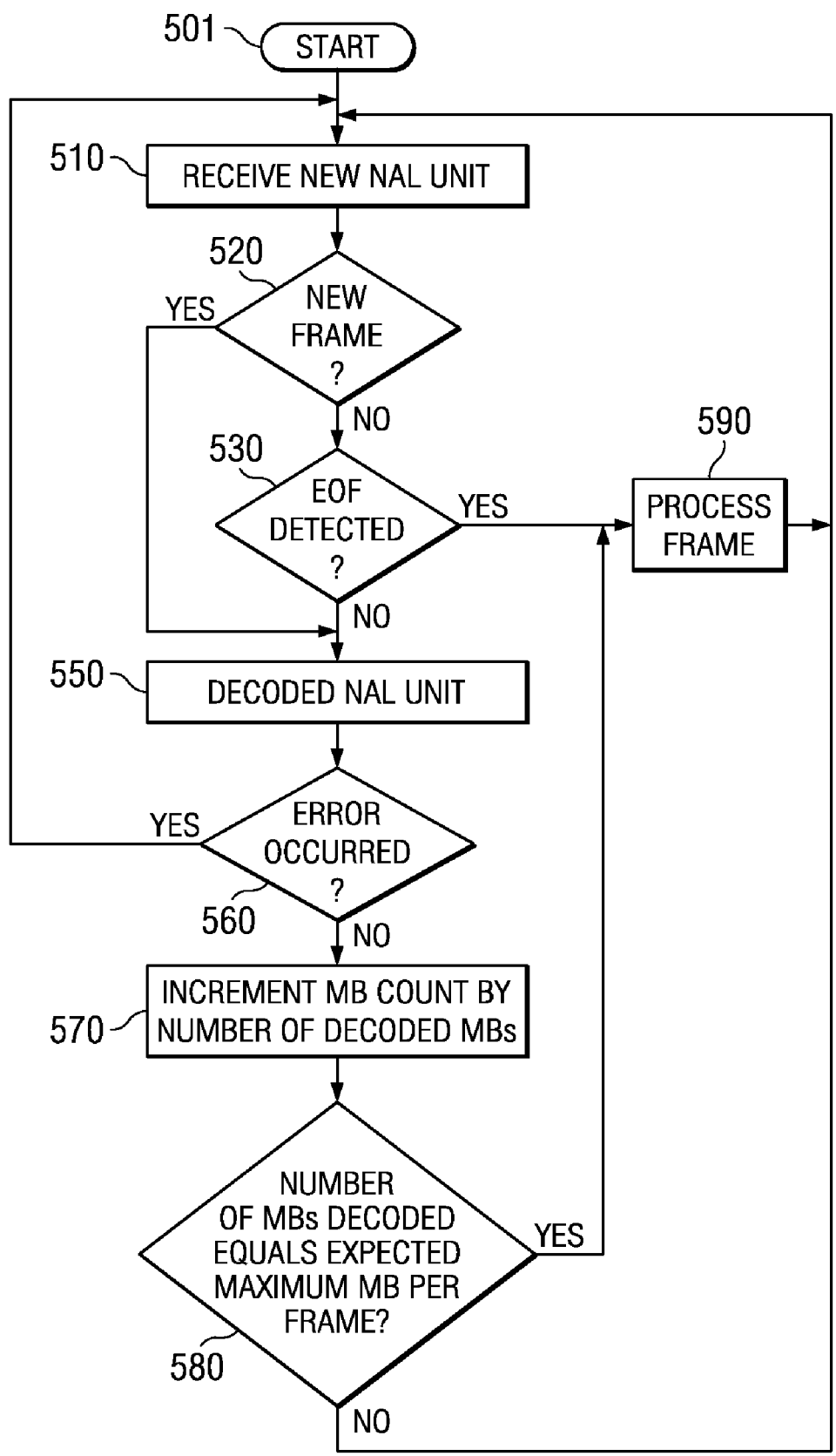
FIG. 5 is a flowchart illustrating the manner in which a decoder processes a frame, in an embodiment of the present invention.

FIG. 5 is a flowchart illustrating the manner in which a decoder detects an end of frame reliably, in an embodiment of the present invention. The flowchart is described in relation to processing block 190, merely for illustration. However, various features can be implemented in other environments and other components. Furthermore, the steps are described in a specific sequence merely for illustration. One or more of the steps may be executed concurrently as well.

Broadly, it may be appreciated that the loop of 510, 520, 550, 560, 570 and 580 operates to detect an end of frame (based on expected number of blocks in the frame) when the slices do not contain error conditions. On the other hand, once an error condition is detected, the loop of 510, 520, 530, 550, 560 and 510 is operative to detect an end of frame (based on the parameter values in the slice headers). The conditions noted above may be checked in this loop. The flowchart starts in step 501, in which control passes immediately to step 510.

In step 510, processing block 190 receives a new NAL Unit. Control then passes to step 520. In step 520, processing block 190 checks whether the new NAL unit contains the start of a new frame. If the new NAL unit contains the start of a new frame, control passes to step 540, else control passes to step 530.

In step 530, processing block 190 determines whether an end of frame (EOF) has occurred based on the relationship-based condition checks noted above (equations 1 through 7). If EOF is determined to have occurred, control passes to step 590, else control passes to step 550.

In step 550, processing block 190 decodes/parses the NAL. If NAL is of type VCL (Video Coding Layer NAL), then processing block 190 decodes the slice header and MB data. Processing block 190 corrects various NAL header and slice header information (such as frame_num, pic_order_cnt_1sb, delta_pic_order_cnt[0], delta_pic_order_cnt[1], adaptive_ref_pic_marking_mode_flag, mmco commands, nal_ref_idc, pic_parameter_set_id, etc.,) based on the relationship that these NAL/slice header information hold with other NAL units or slices belonging to a same frame (as described above).

For example, nal_ref_idc, frame_num, pic_order_cnt_1sb, etc., are common across all slices belonging to a same frame. Assuming a last (previous) frame boundary has already occurred, the current decoded slice can only be a part of the current frame (frame currently being received), and these slice header information should hold the relationship as specified by the standard with the same information belonging to previous decoded slices (if any) of current frame. Control then passes to step 560.

In step 560, processing block 190 checks if an error is present in any of the received slices for the current frame being decoded. If the current slice (or a previous slice of the same frame) is corrupted, then processing block 190 does not rely on the MB counter (number of MBs decoded in current slice information) and skips making the EOF detection check based on the MB count. Processing block 190 may set a flag to indicate the presence of the error, when such is detected when decoding a frame. Control then passes to step to step 510 (when the error condition has existed as manifested by the flag being set), in which processing block 190 receives another NAL unit (a next NAL unit). Processing block 190 may then check the next NAL/slice header content to detect the frame boundary. If current slice is not corrupted (no error is indicated), control passes to step 570.

In step 570, processing block 190 increments the MB count by the number of decoded MBs contained in the received NAL unit. Control then passes to step 580.

In step 580, processing block 190 compares the current number decoded MBs with the maximum number of MBs in a frame. The maximum number of MBs in a frame is determined based on picture resolution (sent in a corresponding SPS type unit), as note above. If the current number of MBs decoded equals the expected maximum number of MBs in a frame, control passes to step 590, else control passes to step 510.

In step 590, processing block 190 processes the complete frame received. Processing may include DPB management, de-blocking and concealment (if any). Control then passes to step 510, and the operations noted above may be repeated.

According to another aspect of the present invention, an H.264 decoder automatically corrects erroneous slice header parameters. In an embodiment of the present invention, some of the NAL/slice header parameters that are corrected are nal_ref_idc, picture_parameter_set_id, frame_num, pic_order_cnt_1sb, picture_order_count, adaptive_ref_pic_marking_mode_flag, and mmco commands. Correction of an erroneous frame_num in a first slice of a frame is described in detail next.

As noted above, frame_num value in a slice header is function of a current as well as a previous frame's nal_ref_idc. In case the parameter, gap_in_frame_num_allowed_flag is disabled (equals 0), then frame_num value of next picture can be predicted using the previous decoded frame_num value, based on the relevant specifications set forth by the H.264 standard, and noted above, and repeated below for convenience.

Rule A: For IDR type NAL units, frame_num should always be zero.

Rule B: For other VCL (video coding layer) NAL units, the following relationships apply:

If the previous frame is a reference frame (i.e., prev_nal_ref_idc != 0), then current frame_num should be prev_frame_num+1% MaxFrameNum].

If the previous frame is a non reference frame (i.e. prev_nal_ref_idc == 0,) then current frame_num should be prev_frame_num.

In the embodiment, a decoder checks for the rules noted above, and makes a validation check each time the first slice of a new frame is received. If the rules noted above are deemed violated, frame_num value is corrected based on an expected value.

Figure 6:
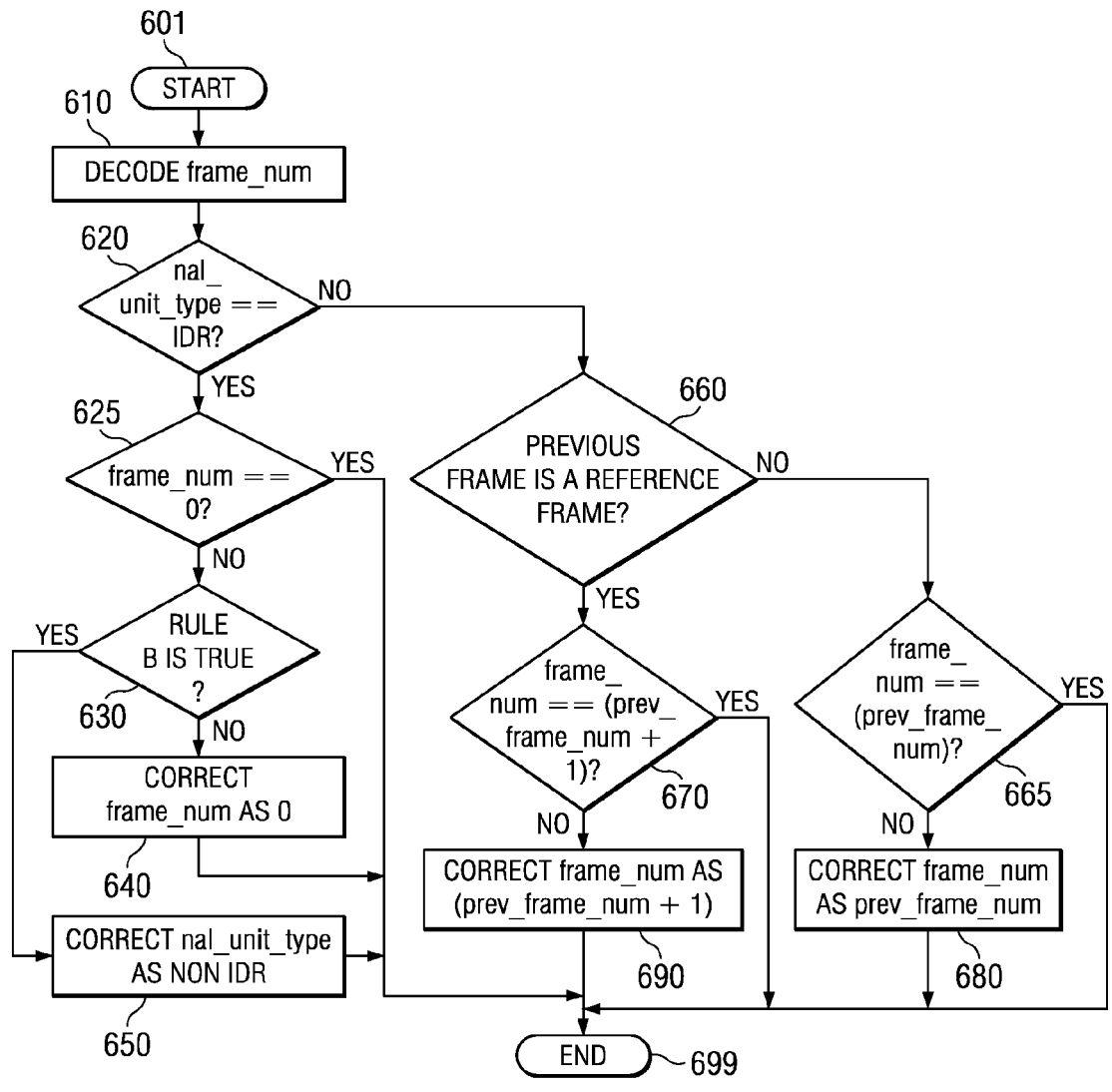
FIG. 6 is a flowchart illustrating the manner in which errors in value frame number in a slice is corrected, in an embodiment of the present invention.

FIG. 6 is a flowchart illustrating the manner in which error in frame_num value of in frames is corrected, in an embodiment of the present invention. The flowchart starts in step 601, in which control passes immediately to step 610.

In step 610, processing block 190 decodes the frame number (frame_num) of a slice. Control then passes to step 620.

In step 620, processing block 190 determines whether the nal_unit_type of the slice indicates that the slice belongs to an IDR (instantaneous decoding refresh) type of frame. If processing block 190 determines that the frame is an IDR frame, control passes to step 625, otherwise control passes to step 660.

In step 625, processing block 190 checks if the value of the parameter frame_num is zero for the slice. If frame_num is zero (consistent with an accurate expected value), control passes to step 699, in which the flowchart ends. If frame_num is non-zero (error condition), control passes to step 630.

Is step 630, processing block 190 determines if 'Rule B' is satisfied (TRUE) or not. 'Rule B', noted above, is reproduced below for convenience:

Rule B: For other VCL (video coding layer) NAL units, the following relationships apply:

If the previous frame is a reference frame (i.e., prev_nal_ref_idc != 0), then current frame_num should be prev_frame_num+1% MaxFrameNum].

If the previous frame is a non reference frame (i.e. prev_nal_ref_idc == 0,) then current frame_num should be prev_frame_num.

If 'Rule B' is satisfied, control then passes to step 650, otherwise, control passes to step 640.

In step 640, processing block 190 corrects parameter frame_num to a value of zero. Control then passes to step 699. In step 650, processing block 190 corrects the value of parameter_nal_unit_type to indicate that the NAL unit is a non-IDR frame.

In step 660, processing block 190 checks if the previous frame received was a reference frame or not. A reference frame is a frame that is used to encode as well as decode other frames. If the previous frame was a reference frame, control passes to step 670, otherwise control passes to step 665.

In step 665, processing block 190 checks if the (current) frame number of the slice is the same as the frame number of the previous slice, i.e., whether (frame_num == (prev_frame_num)). If the current frame number is not the same as the previous frame number, control passes to step 680. Otherwise, control passes to step 699.

In step 670, processing block 190 checks if the frame_num of the current slice has a value one greater than frame number of the previous slice (i.e., frame_num == (prev_frame_num+1)). If (frame_num == (prev_frame_num+1)), control passes to step 699, otherwise control passes to step 690.

In step 680, processing block 190 corrects frame_num to be the same value as prev_frame_num. Control then passes to step 699. In step 690, processing block 190 corrects frame_num to a value equal to (prev_frame_num+1). Control then passes to step 699.

In the context of H.264 standard, all of the above parameters in a slice should be the same across slices belonging to a same frame. In an embodiment of the present invention, parameters of a slice are stored, and a corresponding histogram is maintained. When frame boundary is detected correctly (and values of frame_num are corrected as noted above with respect to flowchart of FIG. 6), the stored parameter information in the form of a histogram is used to auto-correct several other slice header parameters.

Figure 7:
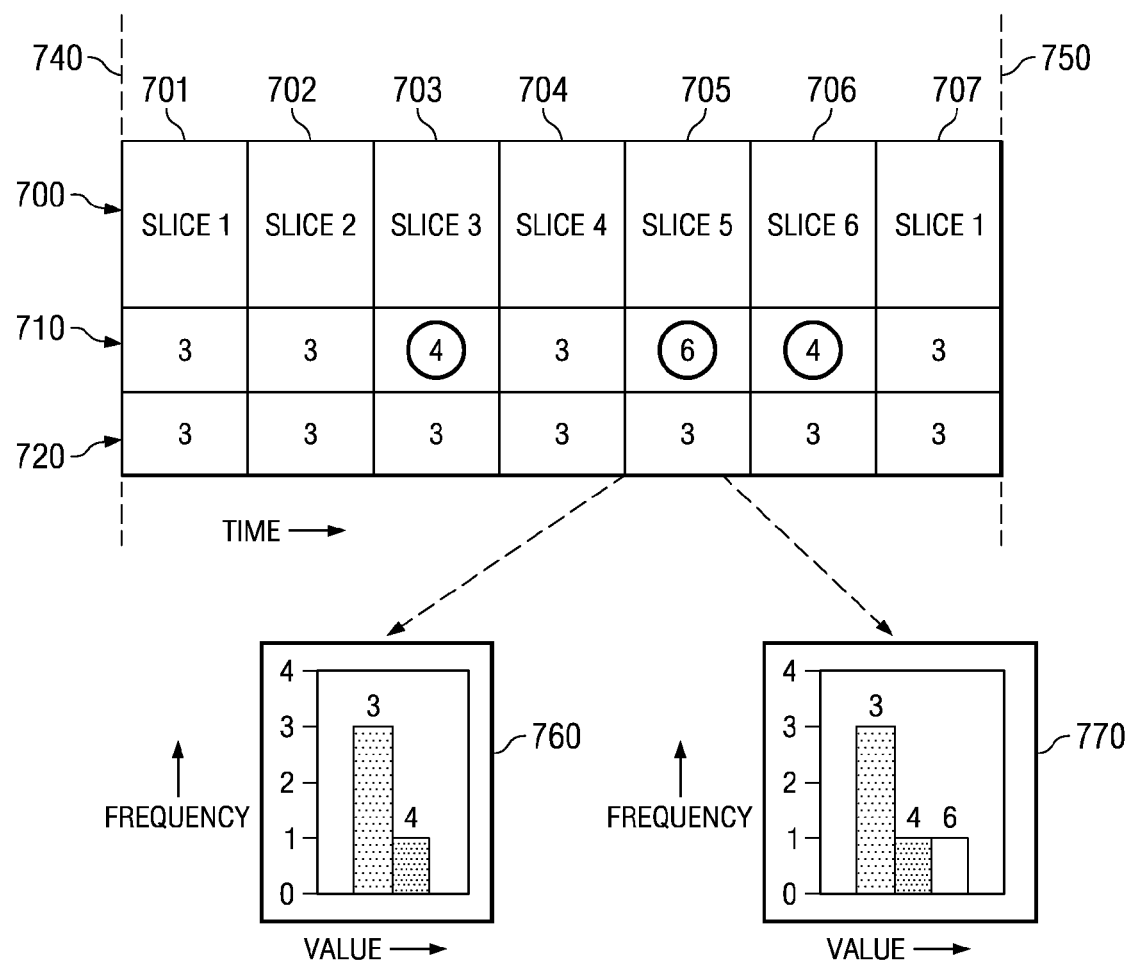
FIG. 7 is a diagram illustrating an example of correction of a slice header parameter, in an embodiment of the present invention.

An example in which parameter picture_order_count is corrected is illustrated with respect FIG. 7. FIG. 7 shows a portion (700) of an example H.264 bit-stream, containing slices 1 through 7 (numbered 701 through 707). Entries in row 710 contain the values of parameter picture_order_count for each of the respective slices. Entries in row 720 contain the corrected values of parameter picture_order_count. Markers 740 and 750 denote respectively the start and end of a frame.

Histogram 760 shows the values (3 and 4) of parameter picture_order_count, as well as the respective frequency of occurrences in slices prior to slice 5 (value 3 is shown as received thrice, while value of 4 as once) in the frame shown in the Figure. Histogram 770 shows the information in histogram 760 updated with the value (and frequency of occurrence) of parameter picture_order_count after receipt of the parameter in slice 5 (value 3 is shown as received thrice, values of 4 and 6 as once). Since statistically the value of 3 has the highest frequency of occurrence in the frame, error value of 6 for the parameter is corrected to 3, for slice 5. Similarly, error values of 4 corresponding to slices 3 and 6 are also corrected to the value 3.

Decoder 135 may be implemented using software, hardware, or a combination of hardware and software. In general, when throughput performance is of primary consideration, the implementation is done more in hardware (e.g., in the form of an application specific integrated circuit). When cost is of primary consideration, the implementation is performed more in software (e.g., using a processor executing instructions provided in software/firmware).

Cost and performance can be balanced by employing a mix of hardware, software and/or firmware. An example embodiment implemented substantially in software is described next.

7. Digital Processing System

Figure 8:
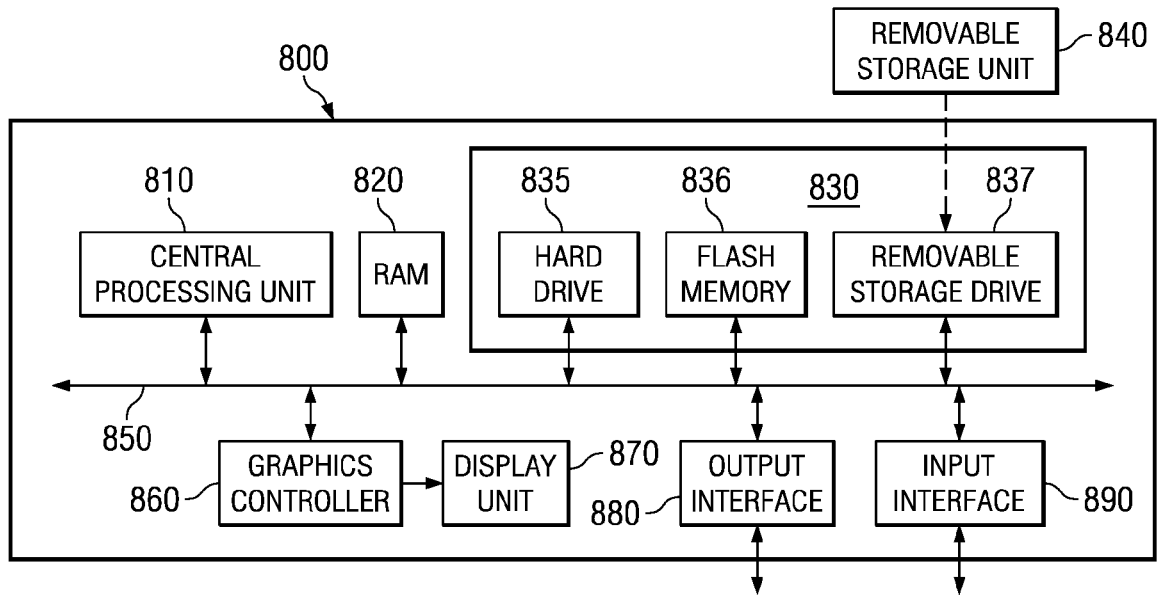
FIG. 8 is a block diagram illustrating the details of a system in which several aspects of the present invention are operative by execution of appropriate software instructions.

FIG. 8 is a block diagram illustrating the details of digital processing system 800 in which several aspects of the present invention are operative by execution of appropriate software instructions. Though shown as a stand alone system, digital processing system may be implemented as a distributed system containing multiple individual systems operating cooperatively.

Digital processing system 800 could be a receiver implemented to receive and decode H.264 (or other standards) data streams as described in the sections above, and may contain one or more processors such as a central processing unit (CPU) 810, random access memory (RAM) 820, secondary memory 830, graphics controller 860, display unit 870, output interface 880 and input interface 890. All the components may communicate with each other over communication path 850, which may contain several buses as is well known in the relevant arts.

CPU 810 (which may correspond to processing block 190 of FIG. 1B) may execute instructions stored in RAM 820 to provide several features of the present invention. CPU 810 may contain multiple processing units, with each processing unit potentially being designed for a specific task. Alternatively, CPU 810 may contain only a single general-purpose processing unit. RAM 820 may receive instructions from secondary memory 830 using communication path 850.

Input interface 890 may correspond to a keyboard and a pointing device (e.g., touch-pad, mouse) and may be used to provide inputs (e.g., user requests to perform an operation on a remote system). Output interface 880 provides connectivity to devices external to system 800, and may be used to communicate with other connected systems (not shown). Output interface 880 may include a network interface.

Secondary memory 830 may contain hard drive 835, flash memory 836, and removable storage drive 837. Secondary memory 830 may store the data and software instructions which enable digital processing system 800 to provide several features in accordance with the present invention.

Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, or removable, etc.).

In this document, the term "computer program product" is used to generally refer to removable storage unit 840 or hard disk installed in hard drive 838. These computer program products are means for providing software to digital processing system 800. CPU 810 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

A module/block may be implemented as a hardware circuit containing custom very large scale integration circuits or gate arrays, off-the-shelf semiconductors such as logic chips, transistors or other discrete components. A module/block may also be implemented in programmable hardware devices such as field programmable gate arrays, programmable array logic, programmable logic devices, or the like.

Modules/blocks may also be implemented in software for execution by various types of processors. An identified module of executable code may, for instance, contain one or more physical or logical blocks of computer instructions which may, for instance, be organized as an object, procedure, or function. Nevertheless, the executables of an identified module need not be physically located together, but may contain disparate instructions stored in different locations which when joined logically together constitute the module/block and achieve the stated purpose for the module/block.

It may be appreciated that a module/block of executable code could be a single instruction, or many instructions and may even be distributed over several code segments, among different programs, and across several memory devices. Further, the functionality described with reference to a single module/block can be split across multiple modules/blocks or alternatively the functionality described with respect to multiple modules/blocks can be combined into a single (or other combination of blocks) as will be apparent to a skilled practitioner based on the disclosure provided herein.

Similarly, operational data may be identified and illustrated herein within modules and may be embodied in any suitable form and organized within any suitable type of data structure. The operational data may be collected as a single data set, or may be distributed over different locations including over different member disks, and may exist, at least partially, merely as electronic signals on a system or network.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of processing a sequence of image frames encoded as a data stream, said method comprising:

identifying a sequence of network abstraction layer (NAL) units in said data stream;

determining a type of each of said sequence of NAL units by parsing the portion of the data stream representing the NAL unit, wherein each type specifies an actual size of NALs of that type;

checking whether each NAL unit has a size consistent with the corresponding actual size according to the type of the NAL unit; and discarding the NAL unit if the size of the NAL unit is inconsistent with the actual size.

2. The method of claim 1, further comprising:

using the NAL unit to recover the corresponding original data in said data stream if the actual size is consistent with the pre-determined size.

3. The method of claim 2, wherein the NAL unit is discarded only if the NAL unit is a header NAL.

4. The method of claim 3, wherein said data stream contains a payload portion and a non-payload portion of a first NAL unit, which is of a data NAL unit type, said method further comprising:

identifying an error in said non-payload portion of said first NAL unit; and correcting said error in said non-payload portion of said first NAL unit;

wherein the first NAL unit is used to recover the corresponding original data after said correcting, wherein the error is identified and corrected after said checking.

5. The method of claim 1, further comprising:

checking whether error conditions are present in the sequence of NAL units, which are data NALs;

if no error conditions are found, determining an end of frame based on an expected number of macro-blocks;

if error condition are found, determining said end of frame by evaluating whether a set of logical conditions, based on the values of parameters in the header portion of one or more slices contained in said sequence of NAL units, are true or not.

6. The method of claim 5, further comprising:

correcting an error in slice headers based on said evaluating.

7. The method of claim 6, wherein said error represents an incorrect frame number of an image frame and said correcting comprises replacing said incorrect frame number with a number determined based on the frame number of previous slices.

8. A method of reliably detecting an end of frame in a data stream representing a sequence of frames, said method comprising:

checking whether error conditions are present in the header portions of a sequence of NAL units representing an image frame;

if no error conditions are found, determining an end of frame of said image frame based on an expected number of macro-blocks in said image frame; and if error condition are found, determining said end of frame by evaluating whether a set of logical conditions, based on the values of parameters in the header portion of one or more slices contained in said sequence of NAL units, are true or not.

* * * * *